July 24, 1951  F. G. EICHEL  2,561,350
OXIDATION OF BENZYL ETHER
Filed July 20, 1948
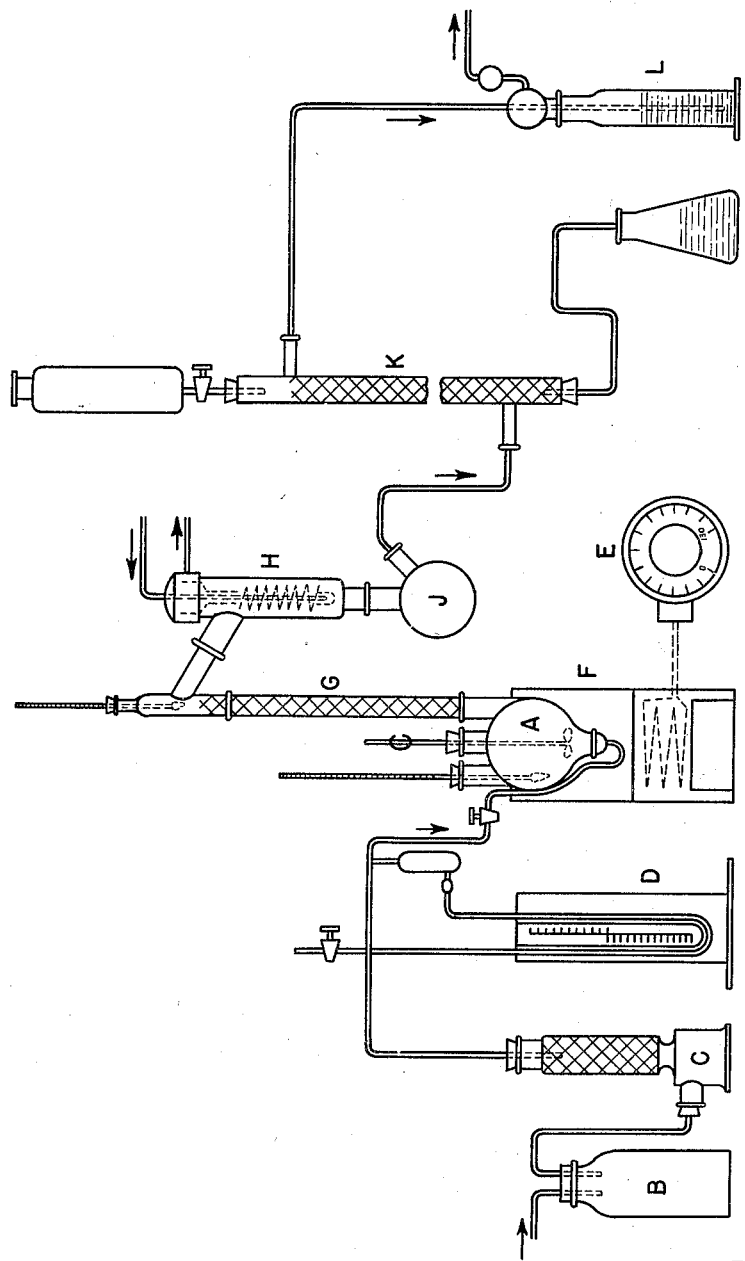
FREDERICK G. EICHEL
INVENTOR.
BY Thomas Cifelli, Jr.
ATTORNEY

UNITED STATES PATENT OFFICE 2,561,350

OXIDATION OF BENZYL ETHER

Frederick G. Eichel, Rutherford, N. J., assignor to The Givaudan Corporation, a corporation of New Jersey Application July 20, 1948, Serial No. 39,757

9 Claims. (Cl. 260—476)

This invention relates to a process for oxidizing benzyl ether by means of air or oxygen at elevated temperatures so as to form commercially-desirable products.

Benzyl ether, although known for almost 100 years since it was prepared by Cannizzaro, still remains of relatively little industrial importance. Because of this fact its formation, for example, as a by-product in the manufacture of benzyl alcohol by the saponification of benzyl chloride, represents a substantial economic loss. Some substances chemically related to benzyl ether, such as benzyl alcohol, benzaldehyde, benzoic acid and benzyl benzoate have considerable commercial importance and demand. A commercially-feasible process for converting benzyl ether into materials such as benzyl alcohol, benzaldehyde, benzoic acid and benzyl benzoate would be of practical interest and application.

Prior investigations involving the treatment of benzyl ether with oxygen did not yield a process of practical interest, for one reason or another. Usually, the amount of benzyl ether converted was too low to permit the process to be feasible commercially.

By my present invention I have succeeded in providing a process for converting benzyl ether into the aforementioned marketable products in yields sufficiently high as to render the process of practical use. My process involves a continuous treatment of benzyl ether with air at elevated temperatures such as 160° C. to 300° C. It has been found that within this temperature range maximum total amounts of the aforementioned desirable products, together with minimum amounts of unreacted benzyl ether and toluene, result.

In general, my novel process may be conducted by placing benzyl ether in a suitable flask, heating it to the desired temperature and blowing dry air or oxygen through the ether, if desired, through a gas-dispersing tube. The resulting vapors are then passed through a fractionating column where the benzaldehyde and benzyl alcohol are removed as overhead products and the benzoic acid, benzyl benzoate and unreacted ether are returned to the oxidation chamber as bottom products. The overhead products are then condensed and the excess air or oxygen saturated with products passing through an absorber packed with a suitable material such as activated alumina or carbon. The benzaldehyde and benzyl alcohol are thereby removed from the oxidation zone and collected in a receiver.

When the desired oxidation is complete the material remaining in the oxidizer is treated with alkali to recover the benzoic acid, and the benzyl benzoate is recovered by distillation of the remaining residue.

As indicated above the temperature at which I conducted my process may be within the range of 160° C. to 300° C. but I have found it advantageous to operate within the range of 180° C. to 220° C. in order to obtain maximum total amounts of the desired products and minimum amounts of toluene and/or benzyl ether. Below 160° C. the amount of unoxidized benzyl ether is very substantial and the volatility of the benzaldehyde is so low that it is not removed fast enough, resulting in further oxidation of the aldehyde. Above 300° C. metakliny of benzyl either becomes an important factor and relatively large amounts of toluene are thereby formed.

The reaction period will vary, depending, inter alia, on the temperatures employed. I have found that a reaction period of about 1 to 6 hours yields the desired results, the shorter period being applicable to temperatures near and at the upper temperature limit, and the longer period being applicable to temperatures near and at the lower temperature limit.

Air rates of from about 500 to about 2500 cc. per minute per mol of ether have been found satisfactory, but other rates may also be employed if desired. Advantageous results have been obtained with air rates of from about 1500 to about 2000 cc. per minute. If oxygen is employed, the rates are correspondingly slower.

In order more fully to illustrates this invention the following example is given.

EXAMPLE

Oxidation of benzyl ether

The apparatus used to conduct the process of my invention is schematically represented on the accompanying drawing and consists of a 500 ml. three-neck flask (A) equipped with a coarse fritted glass gas inlet tube, a thermometer for measuring the temperature of the contents of the flask, and a propeller agitator with a shaft speed of 1000 revolutions per minute.

Air from a compressor was passed through a trap B where entrained oil and water were separated, and then through a 6 inch drying tower C filled with anhydrous calcium sulfate. The dry air was then led through the flow meter D and into the bottom of the oxidation flask A.

Weighed amounts of benzyl ether and catalyst, if used, were charged into the flask which was then heated to the desired temperature by means of a variable transformer E and electric heater F. To minimize fluctuations in temperature due to drafts an asbestos shield was placed around the flask and rested on the heater.

Air was then admitted at a constant rate. The volatile products of oxidation, unreacted ether, and excess air were passed through a column G which was one inch in diameter and packed to a depth of 9 inches with 3/32 inch glass helices. The purpose of this column was to fractionate out the unreacted ether and return it to the oxidation flask A. A thermometer at the top of the column indicated, in a rough manner, the separation that was being effected.

The vapors were condensed by a 4 inch Friedrich's type condenser H, the condensate being collected in a 250 ml. flask J. The non-condensables consisting of excess air saturated with oxidation products were led to the bottom of a glass absorber K. This absorber was one inch in diameter and was packed to a depth of 15 inches with 1/4 inch glass Raschig rings. For the duration of the oxidation mineral oil was trickled down the column and was collected in a 250 ml. Erlenmeyer flask. In order to determine the efficiency of the absorber the scrubbed gases leaving the top of the absorption column were led into a wash bottle L containing 75 ml. of hydroxylamine-bromophenol blue solution. When the color of this solution changed from blue to greenish-yellow it was an indication that 1.7 grams of benzaldehyde had been lost from the system.

The residue remaining in the flask A at the termination of the oxidation was weighed and then analyzed for acid and saponification values. The distillate in the flask J was separated from the small amount of water, weighed, and analyzed for percent benzaldehyde, acid value, and saponification value. The composition of the distillate was determined by fractionation of a sample (usually 50 ml.), previously dried over anhydrous sodium sulfate, in a 12 inch insulated Vigreux column at atmospheric pressure.

Actual recovery of products was accomplished by combining the distillates from a series of oxidations, washing them free of acid with 10% sodium carbonate solution and water, drying them over anhydrous sodium sulfate and then fractionating them in an 18 inch column. This column was one inch in diameter and was packed with 3/32 inch glass helices. Insulation of the column was provided by magnesia pipe covering. The low boiling components were removed atmospherically, the high boilers then being distilled under vacuum.

Identification of toluene was made by boiling point, specific gravity, and refractive index. Benzaldehyde was identified by odor, titration with hydroxylamine solution, specific gravity, and refractive index. Benzyl ether was identified by specific gravity and refractive index as well as by boiling point and its lack of functional groups. Benzyl alcohol was identified by specific gravity, refractive index and acetyl value. The identification of benzyl benzoate was made by saponification value, specific gravity, and refractive index.

Similarly, the residues from a series of oxidations were combined, washed free of acid, dried over sodium sulfate and distilled through an insulated 1 inch by 12 inch Vigreux column under vacuum.

The alkaline washes from the combined distillates and residues were extracted twice with benzene and then made slightly acid to Congo Red paper with 40% sulfuric acid. The liberated acid was filtered off, washed with water, and dried at 50°—60° C. Benzoic acid was identified by acid value and melting point.

The following data indicate typical yields obtainable when using the procedure and apparatus described above, 200 grams of benzyl ether being heated to 180° C. to 190° C. and air at the rate of 1500 to 2000 cc. per minute being passed through the ether for 450 minutes. The yield of various products follows:

| | |
|---|---|
| 5.1 grams toluene | distillate |
| 92.3 grams benzaldehyde | |
| 5.4 grams benzyl alcohol and benzoic acid | |
| 25.0 grams benzoic acid | from residue |
| 55.0 grams benzyl benzoate | |
| 5.0 grams toluene and benzaldehyde | from absorber |

187.8 grams products
9.7 grams unidentified by-products 197.5 grams total recovery The foregoing illustrates my invention which, however, is not to be limited thereby but is to be construed as broadly as permissible in view of the prior art and limited solely by the appended claims.

I claim:

1. A process for oxidizing benzyl ether which comprises reacting benzyl ether and at least one material selected from the group consisting of oxygen and air at a temperature within the range of about 160° C. to about 300° C.

2. A process for oxidizing benzyl ether which comprises reacting benzyl ether and air at a temperature within the range of about 160° C. to about 300° C.

3. A process for oxidizing benzyl ether which comprises reacting benzyl ether and at least one material selected from the group consisting of oxygen and air at a temperature within the range of about 180° C. to about 220° C.

4. A process for oxidizing benzyl ether which comprises reacting benzyl ether and air at a temperature within the range of about 180° C. to about 220° C.

5. A process for oxidizing benzyl ether which comprises continuously adding at least one material selected from the group consisting of oxygen and air to benzyl ether maintained at a temperature within the range of about 160° C. to about 300° C., and removing volatile products continuously from the reaction chamber.

6. A process for oxidizing benzyl ether which comprises continuously adding air to benzyl ether maintained at a temperature within the range of about 160° C. to about 300° C., and removing volatile products continuously from the reaction chamber.

7. A process for oxidizing benzyl ether which comprises continuously adding at least one material selected from the group consisting of oxygen and air to benzyl ether maintained at a temperature within the range of about 180° C. to about 220° C., and removing volatile products continuously from the reaction chamber.

8. A process for oxidizing benzyl ether which comprises continuously adding air to benzyl ether maintained at a temperature within the range of about 180° C. to about 220° C., and removing volatile products continuously from the reaction chamber.

9. A process for oxidizing benzyl ether which comprises introducing from 1500 to 2000 cc. of air per minute continuously per mol of benzyl ether maintained at a temperature within a range of about 180° C. to about 220° C. and removing benzaldehyde and benzyl alcohol continuously from the reaction chamber, treating the contents of the reaction chamber with alkali, isolating the benzoic acid in the form of a salt thereof from an aqueous layer and recoving benzyl benzoate by distillation of the oily layer.

FREDERICK G. EICHEL.

REFERENCES CITED

The following references are of record in the file of this patent:

Clover, Journ. Amer. Chem. Soc., vol. 46 page 428 (1924).
Fischer, Ann. der Chem., vol. 476, page 247 (1929).
Milas, J. A. C. S., vol. 53, pp. 221–233 (1931).
Rieche et al., Angew. Chem., vol. 49, pp. 101–103 (1936).